(12) United States Patent
Noma et al.

(10) Patent No.: US 10,133,811 B2
(45) Date of Patent: Nov. 20, 2018

(54) NON-TRANSITORY COMPUTER-READABLE RECORDING MEDIUM, DATA ARRANGEMENT METHOD, AND DATA ARRANGEMENT APPARATUS

(71) Applicant: FUJITSU LIMITED, Kawasaki-shi, Kanagawa (JP)

(72) Inventors: Yui Noma, Kawasaki (JP); Makiko Konoshima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 342 days.

(21) Appl. No.: 15/064,982

(22) Filed: Mar. 9, 2016

(65) Prior Publication Data

US 2016/0267173 A1 Sep. 15, 2016

(30) Foreign Application Priority Data

Mar. 11, 2015 (JP) .................. 2015-048214

(51) Int. Cl.
G06F 17/30 (2006.01)

(52) U.S. Cl.
CPC .. *G06F 17/30675* (2013.01); *G06F 17/30312* (2013.01); *G06F 17/30483* (2013.01); *G06F 17/30575* (2013.01); *G06F 17/30705* (2013.01)

(58) Field of Classification Search
CPC ...................................................... G06F 17/30
USPC ................................ 707/737, 741
See application file for complete search history.

(56) References Cited

U.S. PATENT DOCUMENTS

| | | | | |
|---|---|---|---|---|
| 6,741,742 B1 * | 5/2004 | Hagiwara | ............... | A63F 13/10 382/209 |
| 8,295,603 B2 * | 10/2012 | Ohira | ...................... | H04N 1/44 382/124 |
| 8,312,136 B2 * | 11/2012 | Tanaka | ................ | G06F 17/3409 707/613 |
| 8,838,565 B2 * | 9/2014 | Bradshaw | ............ | G06F 19/321 707/706 |
| 9,536,196 B2 * | 1/2017 | Linehan | .................. | G06N 5/02 |
| 9,620,123 B2 * | 4/2017 | Faians | ................ | G06Q 30/0185 |
| 9,703,837 B1 * | 7/2017 | Teng | ................... | G06F 17/3053 |
| 9,811,813 B2 * | 11/2017 | Laracey | ............... | G06Q 20/108 |
| 2009/0150376 A1 | 6/2009 | O'Callaghan et al. | | |

FOREIGN PATENT DOCUMENTS

| | | |
|---|---|---|
| JP | 2001-134593 | 5/2001 |
| JP | 2007-323319 | 12/2007 |
| JP | 2009-509215 | 3/2009 |
| JP | 2011-103082 | 5/2011 |
| JP | 2013-196212 | 9/2013 |

(Continued)

OTHER PUBLICATIONS

Extended European Search Report dated Jul. 21, 2016 for corresponding European Patent Application No. 16159633.3, 9 pages.

(Continued)

*Primary Examiner* — Kim T Nguyen
(74) *Attorney, Agent, or Firm* — Fujitsu Patent Center

(57) ABSTRACT

A data arrangement apparatus executes a process request on data stored in a database, calculates similarity of a process in a combination of the process request and the data, divides the data in such a manner as to distribute the similarity and processes a process request accepted for the divided data.

3 Claims, 15 Drawing Sheets

| | QUERY DATA SET q1 | QUERY DATA SET q2 | QUERY DATA SET q3 | ... | QUERY DATA SET qQ |
|---|---|---|---|---|---|
| RECORD DATA SET r1 | 5 SECONDS | 8 SECONDS | 10 SECONDS | ... | 5 SECONDS |
| RECORD DATA SET r2 | 0.1 SECONDS | 7 SECONDS | 11 SECONDS | ... | 0.2 SECONDS |
| RECORD DATA SET r3 | 1 SECONDS | 1 SECONDS | 1 SECONDS | ... | 0.5 SECONDS |
| RECORD DATA SET r4 | 1.1 SECONDS | 0.9 SECONDS | 1 SECONDS | ... | 0.5 SECONDS |
| ⋮ | | | | | |

110b

(56) References Cited

FOREIGN PATENT DOCUMENTS

WO   2007020423       2/2007
WO   2010060179 A1   6/2010

OTHER PUBLICATIONS

Tonini, Gustavo et al.,"A Distributed Data Allocation Algorithm for Biological Databases", 2013 IEEE 16th International Conference on Computational Science and Engineering, pp. 531-537, Dec. 3, 2013, XP032573321.
Novak, David et al.,,"Large-scale similarity data management with distributed Metric Index", Information Processing and Management, vol. 48, No. 5, Jan. 26, 2011, pp. 855-872, XP028930776.
Matsubara, Daisuke et al., "High-Speed Similarity-Based Image Retrieval with Data-Alignment Optimization Using Self-Organization Algorithm", 2009 11th IEEE International Symposium on Multimedia, Dec. 14, 2009, pp. 312-317, XP031587773.

\* cited by examiner

FIG.5

|  | QUERY DATA SET q1 | QUERY DATA SET q2 | QUERY DATA SET q3 | ... | QUERY DATA SET qQ |
|---|---|---|---|---|---|
| RECORD DATA SET r1 | 5 SECONDS | 8 SECONDS | 10 SECONDS | ... | 5 SECONDS |
| RECORD DATA SET r2 | 0.1 SECONDS | 7 SECONDS | 11 SECONDS | ... | 0.2 SECONDS |
| RECORD DATA SET r3 | 1 SECONDS | 1 SECONDS | 1 SECONDS | ... | 0.5 SECONDS |
| RECORD DATA SET r4 | 1.1 SECONDS | 0.9 SECONDS | 1 SECONDS | ... | 0.5 SECONDS |

FIG.7

| DATA IDENTIFIER | RECORD DATA SET | CLUSTER IDENTIFIER |
|---|---|---|
| 001 | (2.0, 4.1, 6.4) | C001 |
| 002 | (24.2, 14.3, 96, 6) | C003 |
| 003 | (20.8, 6.6, 7.9) | C014 |
| 004 | (120.8, 16.6, 17.9) | C011 |
| ⋮ | ⋮ | ⋮ |

| DATA IDENTIFIER \ DATA IDENTIFIER | 001 | 002 | 003 | 004 | |
|---|---|---|---|---|---|
| 001 | - | 10 | 25 | -∞ | |
| 002 | 10 | - | 20 | -∞ | ... |
| 003 | 25 | 20 | - | -∞ | |
| 004 | -∞ | -∞ | -∞ | - | |
| ⋮ | | | | | |

| DATA IDENTIFIER | ARRANGEMENT LOCATION |
|---|---|
| 001 | COMPUTATIONAL RESOURCE S1 |
| 002 | COMPUTATIONAL RESOURCE S3 |
| 003 | COMPUTATIONAL RESOURCE S1 |
| 004 | UNDETERMINED |
| ⋮ | ⋮ |

110d

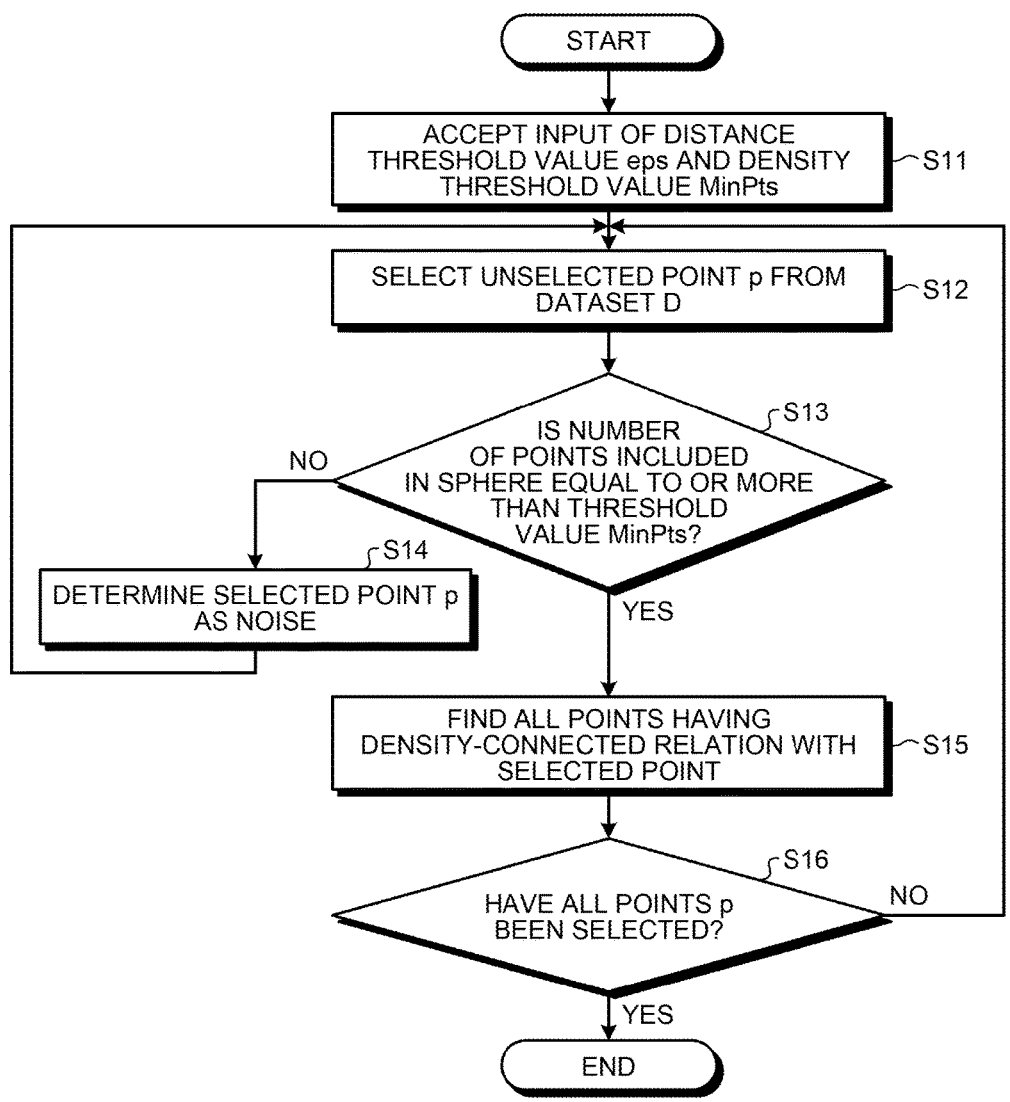

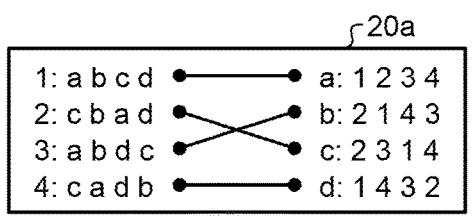 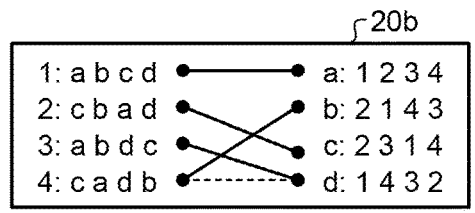
FIG.15

NON-TRANSITORY COMPUTER-READABLE RECORDING MEDIUM, DATA ARRANGEMENT METHOD, AND DATA ARRANGEMENT APPARATUS

CROSS-REFERENCE TO RELATED APPLICATION(S)

This application is based upon and claims the benefit of priority of the prior Japanese Patent Application No. 2015-048214, filed on Mar. 11, 2015, the entire contents of which are incorporated herein by reference.

FIELD

The embodiment discussed herein is related to a data arrangement program and the like.

BACKGROUND

The matching process and the calculation of similarity using unstructured data such as images, audio, and sensor data take time in many cases. Hence, there is a known technology that brings efficiency to the matching process by allocating record data to a plurality of computational resources to distribute the process.

FIG. 19 is a diagram for explaining an example of the known technology. For example, if a certain query is used to match record data, there is a case where the processing time does not depend on the query but depends only on the record data. For example, if the time, in seconds, of a given frequency component in a music file is counted, the processing time depends on the length of the music. In such a case, a mixed integer programming problem is solved, and the record data is distributed to computational resources in such a manner as to make the processes substantially equal.

In the example illustrated in FIG. 19, there are record data sets $10a$ to $10j$. The length of each record data set is assumed to be the processing time needed to process the record data set. For example, the record data sets $10a$, $10b$, and $10j$ are distributed to a first server. The record data sets $10c$, $10e$, $10d$, and $10g$ are distributed to a second server. The record data sets $10i$, $10f$, and $10h$ are distributed to a third server. The record data sets $10a$ to $10j$ are distributed in this manner to enable the equalization of the processing times. These related-art examples are described, for example, in Japanese Laid-open Patent Publication No. 2013-196212, Japanese Laid-open Patent Publication No. 2007-323319, Japanese National Publication of International Patent Application No. 2009-509215, Japanese Laid-open Patent Publication No. 2011-103082, Japanese Laid-open Patent Publication No. 2001-134593.

However, the above-mentioned known technology has a problem that the time needed to execute query data is long.

In some cases, the processing time does not depend only on record data, and the processing time varies depending on a data pair of query data and record data. If, for example, query data is similar to record data, the processing time to process the record data is increased. Hence, if a plurality of sets of record data similar to query data is concentrated and arranged in a given computational resource, the processing time of the given computational resource is increased.

SUMMARY

According to an aspect of an embodiment, a non-transitory computer-readable recording medium stores therein a data arrangement program that causes a computer to execute a process including: executing a process request on data stored in a database; calculating similarity of a process in a combination of the process request and the data; dividing the data in such a manner as to distribute the similarity; and processing a process request accepted for the divided data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of the data structure of an intermediate table;

FIG. 7 is a diagram illustrating an example of the data structure of a record data table;

FIG. 8 is a diagram illustrating an example of the data structure of similarity matrix data;

FIG. 11 is a flowchart conceptually explaining the DBSCAN algorithm;

FIG. 15 is a diagram for explaining a stable matching and an unstable matching;

DESCRIPTION OF EMBODIMENTS

Preferred embodiments of the present invention will be explained with reference to accompanying drawings. The embodiment is not intended to limit the present invention.

An example of the process of the data arrangement apparatus according to the embodiment is described. FIGS. 1 to 4 are diagrams for explaining the process of the data arrangement apparatus according to the embodiment.

Figure 1:
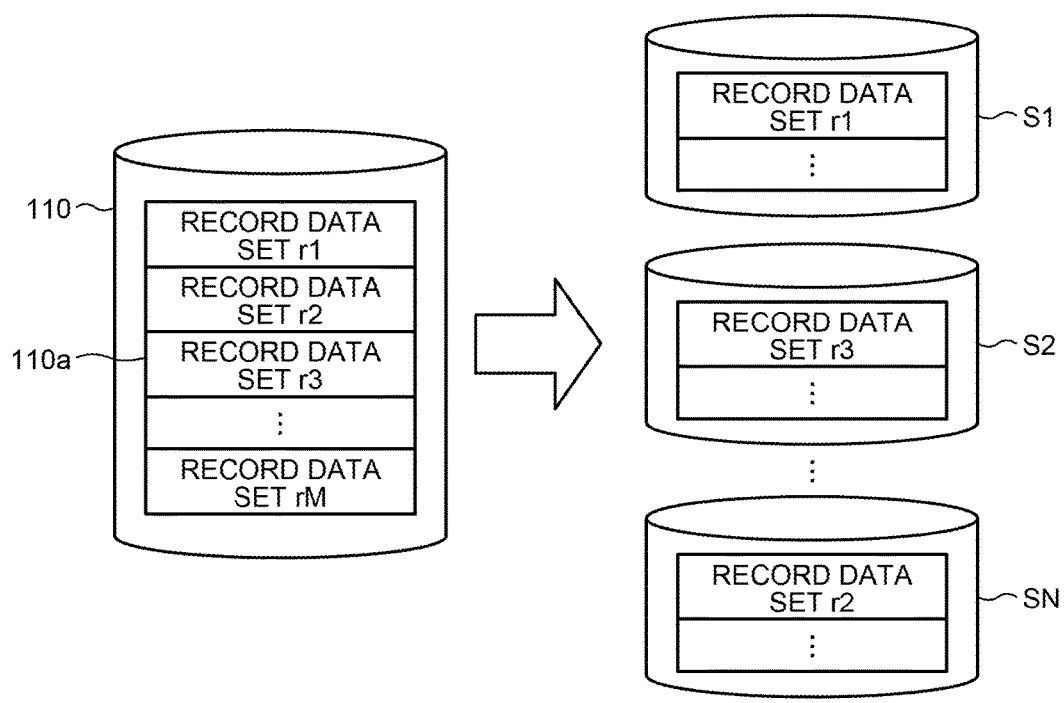
FIG. 1 is a first diagram for explaining the process of a data arrangement apparatus according to the embodiment.

FIG. 1 is described. For example, the data arrangement apparatus includes a storage unit 110 and N computational resources S1 to SN. The storage unit 110 stores a record data table 110a. The record data table 110a stores M record data sets r1 to rM. The data arrangement apparatus uses a known technique to distribute and arrange the record data sets r1 to rM in the computational resources S1 to SN. For example, the data arrangement apparatus randomly allocates the record data sets r1 to rM to the computational resources S1 to SN in such a manner as to substantially equalize the number of record data sets stored in each of the computational resources S1 to SN.

Figure 2:
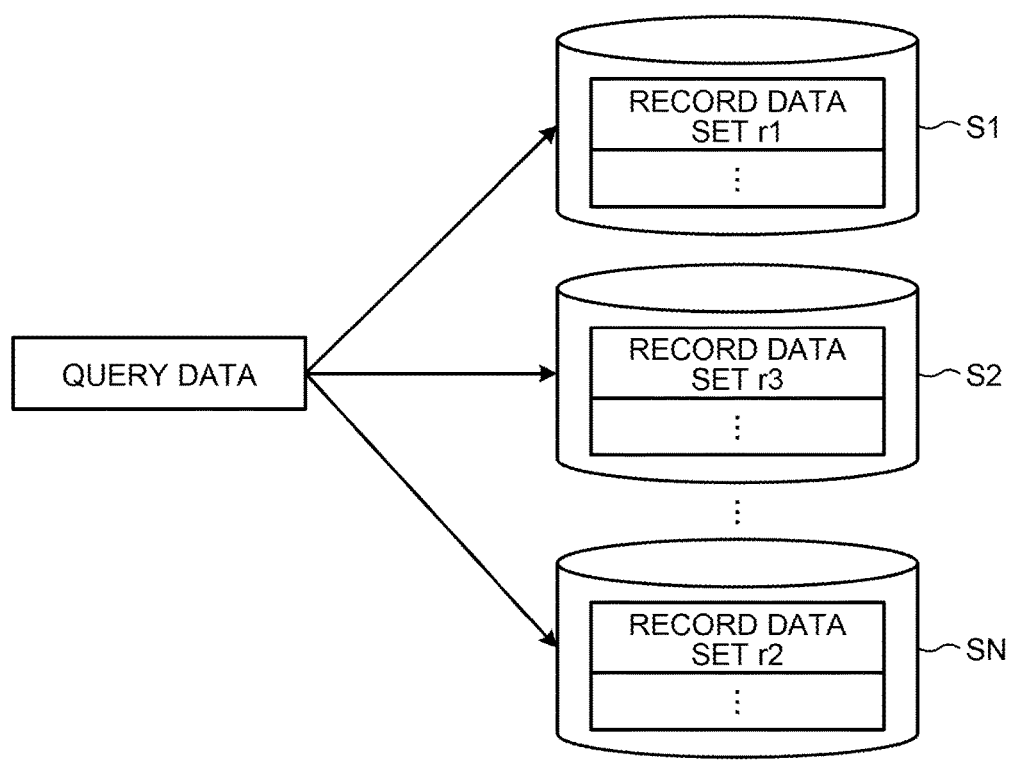
FIG. 2 is a second diagram for explaining the process of the data arrangement apparatus according to the embodiment.

FIG. 2 is described. When having accepted query data, the data arrangement apparatus uses the query data to perform a search/matching process on the record data sets stored in the computational resources S1 to SM. The data arrangement apparatus measures the processing time of the process of each record data set with the query data, and registers the measurement results in an intermediate table. The data arrangement apparatus repeatedly executes the above process whenever receiving query data.

FIG. 5 is a diagram illustrating an example of the data structure of the intermediate table. An intermediate table 110b is a table that associates query data, record data, and a processing time needed for processing. For example, the row corresponding to the record data set r1 illustrated in FIG. 5 indicates the processing times with the use of query data sets q1 to qQ. For example, the processing time of a case where the query data set q1 is used to process the record data set r1 is "five seconds." Generally, if query data is similar to record data, the processing time is increased. Hence, the processing time illustrated in the intermediate table 110b can be said to be an index indicating the similarity between query data and record data.

In the following description, a group of processing times of a record data set based on query data sets is expressed as the processing time vector, as appropriate. For example, the processing time vector of the record data set r1 is (5, 8, 10, . . . , 5). For example, a record data set including the processing times for all the query data sets q1 to qQ is a record data set existing in the whole space.

In FIG. 5, the entire pattern is similar between the processing time vector of the record data set r3 and the processing time vector of the record data set r4. In contrast, part of the pattern related to the query data sets q2 and q3 is similar between the processing time vector of the record data set r1 and the processing time vector of the record data set r2, but the other part is low in similarity. Accordingly, the entire pattern is not similar.

The data arrangement apparatus uses subspace clustering or projected clustering to search for record data sets having a partially similar pattern of the processing time vector to each other. For example, the record data sets having a partially similar pattern of the processing time vector to each other are the record data sets r1 and r2 in the example illustrated in FIG. 5.

Figure 3:
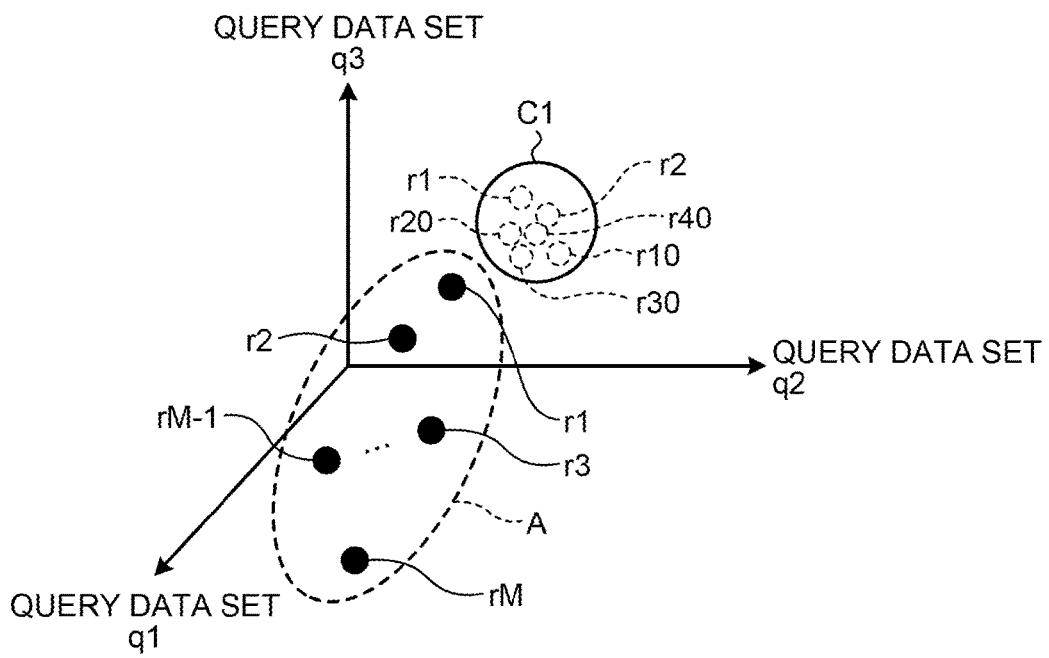
FIG. 3 is a third diagram for explaining the process of the data arrangement apparatus according to the embodiment.

FIG. 3 is described. The data arrangement apparatus finds a set of record data sets creating a cluster when the record data sets r1 to rM existing in the whole space A are projected onto an axis-parallel low-dimensional subspace. For example, if the data arrangement apparatus projects the record data sets r1 to rM existing in the whole space A onto a plane of the query data q2 and the query data q3, a cluster C1 including the record data sets r1, r2, r10, r20, r30, and r40 is assumed to be generated. In this case, the data arrangement apparatus determines that the record data sets r1, r2, r10, r20, r30, and r40 are a set of record data sets having a partially similar processing time vector to each other.

Figure 4:
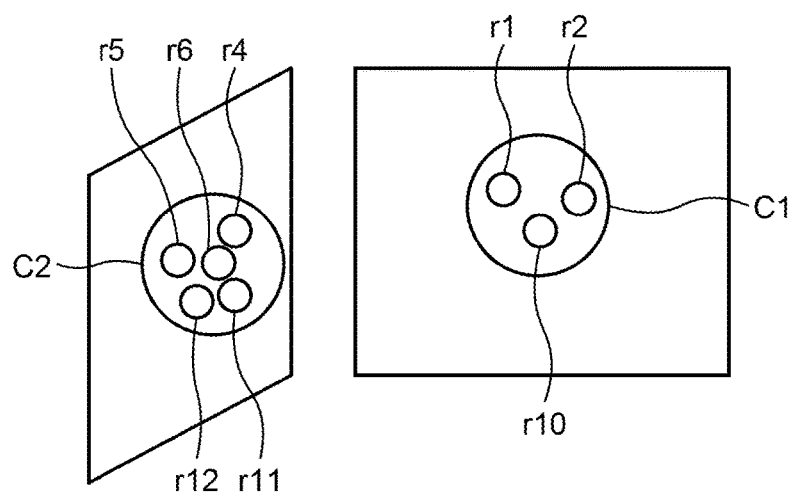
FIG. 4 is a fourth diagram for explaining the process of the data arrangement apparatus according to the embodiment.

FIG. 4 is described. The data arrangement apparatus calculates the similarity of record data sets belonging to the same cluster based on the distances between the record data sets. On the other hand, the similarity of record data sets belonging to different clusters are set to minus ∞. For example, in the example illustrated in FIG. 4, the cluster C1 includes the record data sets r1, r2, and r10. A cluster C2 includes the record data sets r4, r5, r6, r11, and r12.

The data arrangement apparatus calculates the similarity of the record data set r1 with the record data sets r2 and r10 belonging to the same cluster based on the distances. The data arrangement apparatus sets −∞ for the similarity of the record data set r1 with the record data sets belonging to the different cluster. The data arrangement apparatus executes a similar process for the other record data sets. Accordingly, the similarity of each record data set is calculated to generate similarity matrix data. The similarity matrix data is data that defines the similarity between record data sets.

The data arrangement apparatus obtains a stable matching based on the similarity matrix data in order to prevent the arrangement of record data sets having high similarity in the same computational resource. The data arrangement apparatus arranges the record data sets r1 to rM in the computational resources S1 to SN.

Figure 6:
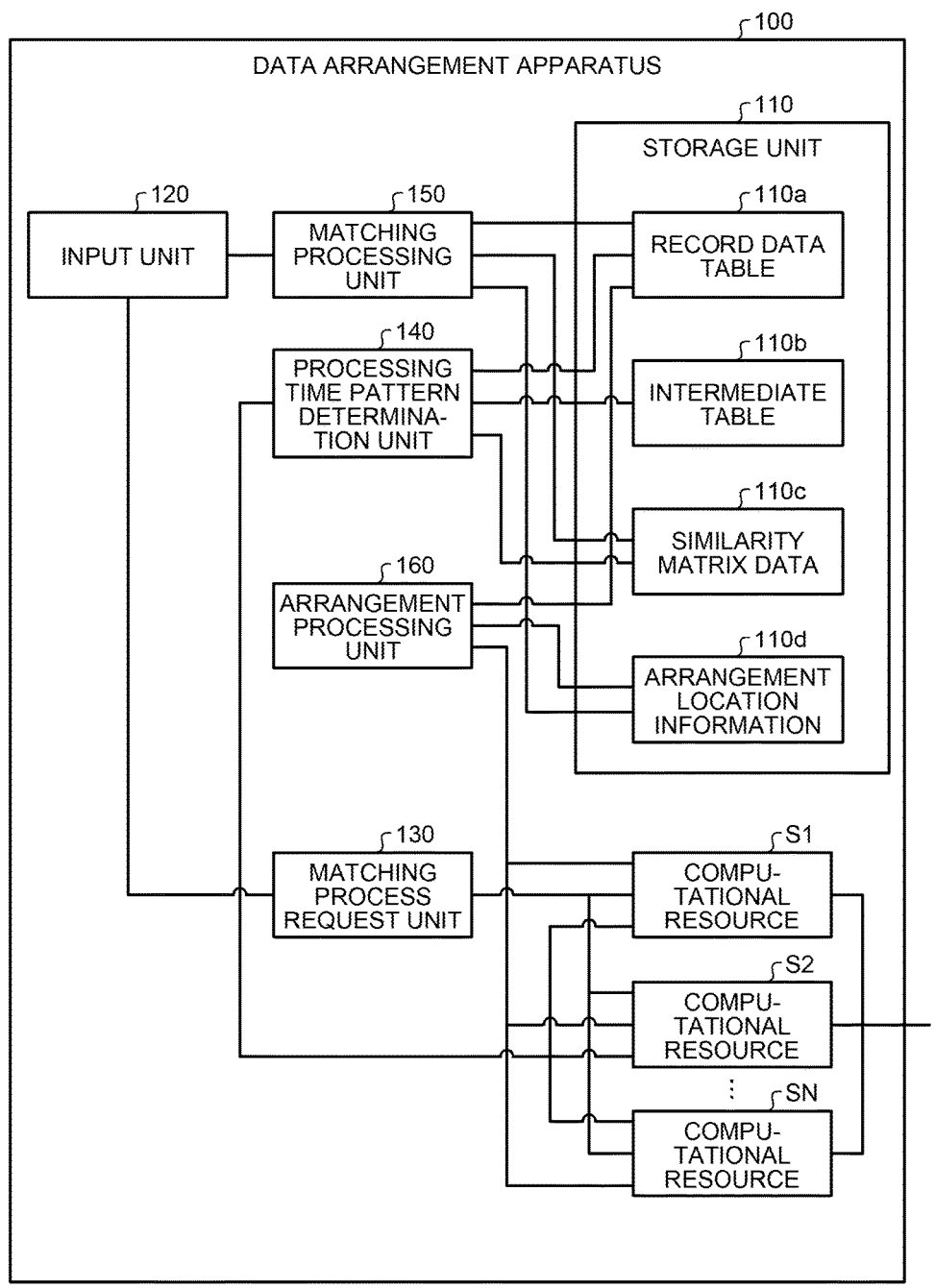
FIG. 6 is a functional block diagram illustrating the configuration of the data arrangement apparatus according to the embodiment.

Next, an example of the configuration of the data arrangement apparatus according to the embodiment is described. FIG. 6 is a functional block diagram illustrating the configuration of the data arrangement apparatus according to the embodiment. As illustrated in FIG. 6, a data arrangement apparatus 100 includes the computational resources S1 to SN, a storage unit 110, an input unit 120, a matching process request unit 130, a processing time pattern determination unit 140, a matching processing unit 150, and an arrangement processing unit 160. Among them, the processing time pattern determination unit 140 corresponds a calculation unit. The matching processing unit 150 and the arrangement processing unit 160 correspond to an arrangement unit.

The computational resource S1 is a device that executes a process of checking a plurality of record data sets arranged in the computational resource S1 against query data acquired from the matching process request unit 130, and searching for a record data set corresponding to the query data. The computational resource S1 outputs the search result to an external device. Moreover, the computational resource S1 repeatedly executes the above process whenever acquiring query data from the matching process request unit 130. Moreover, the computational resource S1 measures a processing time needed for matching of a pair of query data and record data to notify processing time data to the processing time pattern determination unit 140 on a pair of query data and record data basis. The description of processing for the computational resources S2 to SN is similar to that of the computational resource S1. For example, the data arrangement apparatus includes the N computational resources S1 to SN.

The storage unit 110 includes a record data table 110a, an intermediate table 110b, similarity matrix data 110c, and arrangement location information 110d. The storage unit 110 corresponds to a storage device such as a semiconductor memory device, for example, RAM (Random Access Memory), ROM (Read Only Memory), or flash memory (Flash Memory).

The record data table 110a is a table including record data arranged in the computational resources S1 to SN. FIG. 7 is a diagram illustrating an example of the data structure of the record data table. As illustrated in FIG. 7, the record data table 110a associates a data identifier with record data. The data identifier is information for uniquely identifying record data. Record data is data arranged in each of the computational resources S1 to SN. For example, record data corresponding to a data identifier "001" is "2.0, 4.1, 6.4." Here, the example was illustrated in which a data identifier is associated with a group of record data. However, a single data identifier may be associated with a single record datum.

Moreover, the record data table 110a may further associate record data with a cluster identifier. The cluster identifier is information for uniquely identifying a cluster to which record data belongs. The processing time pattern determination unit 140, which is described below, sets a cluster identifier corresponding to record data. Although the illustration is omitted, the record data table 110a may further associate the number of dimensions and the density of a cluster with a cluster identifier, and hold the number of dimensions and the density of a cluster.

The intermediate table 110b is a table that associates query data, record data, and a processing time needed for processing to check the record data against the query data. The data structure of the intermediate table 110b corresponds to the intermediate table 110b illustrated in FIG. 5.

The similarity matrix data 110c is data indicating the similarity of each record data set. FIG. 8 is a diagram illustrating an example of the data structure of the similarity matrix data. In the example illustrated in FIG. 8, each data identifier's group is associated with their similarity with the other data identifiers' groups. For example, the similarity of the record data of the data identifier "001" with the other record data is registered in a first row in the similarity matrix data 110c of FIG. 8. For example, the similarity between the record data of the data identifier "001" and the record data of the data identifier "002" is "10".

Figures 9, 10:
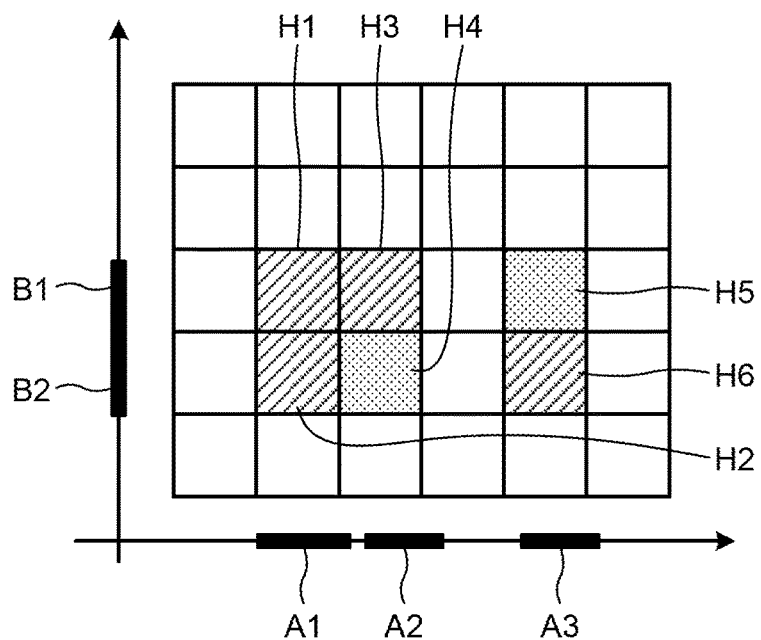
FIG. 9 is a diagram illustrating an example of the data structure of arrangement location information.
FIG. 10 is a diagram for schematically explaining the CLIQUE algorithm.

The arrangement location information 110d is information indicating a location where data is arranged. FIG. 9 is a diagram illustrating an example of the data structure of the arrangement location information. As illustrated in FIG. 9, the arrangement location information 110d associates a data identifier with an arrangement location. The data identifier corresponds to the data identifier described in FIG. 7 and the like. The arrangement location is information for uniquely identifying a computational resource where data is arranged. For example, in FIG. 9, an arrangement location of the data corresponding to the data identifier "001" is the "computational resource S1."

The description is returned to FIG. 6. The input unit 120 is an input device for inputting various pieces of information into the matching process request unit 130 and the matching processing unit 150. For example, the input unit 120 corresponds to a keyboard, a mouse, a touchscreen, and the like. For example, a user operates the input unit 120 to input query data into the matching process request unit 130. Accordingly, a matching request is made. Moreover, the user operates the input unit 120 to input a data array determination request into the matching processing unit 150.

The matching process request unit 130 is a processing unit that outputs query data to the computational resources S1 to SN and makes a matching process request when having acquired the query data from the input unit 120.

The processing time pattern determination unit 140 acquires information on pairs of query data and record data and their processing time from the computational resources S1 to SN. The processing time pattern determination unit 140 generates the intermediate table 110b based on the acquired information. Moreover, the processing time pattern determination unit 140 performs subspace clustering on each processing time vector based on the intermediate table 110b, and accordingly classifies the processing time vectors according to the processing time vectors having similarity in part of the pattern of the processing time. The processing time pattern determination unit 140 calculates the distance between record data sets as similarity for record data sets of processing time vectors classified into the same cluster. Moreover, the processing time pattern determination unit 140 sets $-\infty$ for the similarity between record data sets that belong to different clusters. The processing time pattern determination unit 140 executes the above process to generate the similarity matrix data 110c.

Next, a specific description is given of the process of the processing time pattern determination unit 140. The processing time pattern determination unit 140 pre-processes the intermediate table 110b to execute subspace clustering on the pre-processed intermediate table 110b.

The pre-processing executed by the processing time pattern determination unit 140 is described. As a precondition, the number of computational resources is N. The number of query data sets is Q. The number of record data sets is M. The processing time of an i-th record data set ri with a j-th query data set qj is Tij. A processing time matrix P is an M×Q matrix. Each (i, j) element of the processing time matrix P is Tij. Each value of the processing time matrix P corresponds to each value of the intermediate table 110b. A j-th column vector of the processing time matrix P is a "feature vector" of a j-th attribute.

The processing time pattern determination unit 140 uses the clustering technique such as k-means or x-means to merge similar feature vectors. For example, the processing time pattern determination unit 140 clusters the Q feature vectors included in the processing time matrix P, and classifies the Q feature vectors into Q' clusters. The processing time pattern determination unit 140 obtains arithmetic means of feature vectors classified into the same cluster to merge the feature vectors. Such pre-processing is executed by the processing time pattern determination unit 140. Accordingly, the processing time matrix P of the M×Q matrix becomes a processing time matrix P' of an M×Q' matrix.

For example, the processing time pattern determination unit 140 sets a j-th column vector of the processing time matrix P' as the arithmetic mean of vectors belonging to a j-th cluster. Moreover, the processing time pattern determination unit 140 sets a j-th component of a Q'-dimensional vector of a weighted matrix W as the square root of the number of vectors belonging to the j-th cluster. The processing time pattern determination unit 140 sets an i-th row vector of the processing time matrix P' as the processing time vector of the record data set ri.

The reason that the processing time pattern determination unit 140 performs pre-processing is described here. A processing time pattern space where clustering is performed tends to have a large number of dimensions. From the viewpoint of the calculation amount, it is better to have a smaller number of attributes. Hence, the processing time pattern determination unit 140 reduces the dimensions of the processing time pattern space by merging similar attributes into one.

If the similar attributes are merged into one to reduce the dimensions of the processing time pattern space, the distance between record data sets in a space after the deletion is different from the distance in the original space. For example, x and y are similar attributes in a three-dimensional space of x, y, and z, all record data sets are on an x=y plane. Hence, x and y are merged to be an attribute w. A Euclidean distance between two points in the three-dimensional space of x, y, and z is different from a Euclidean distance in the z and w space. At this point in time, a Euclidean distance is used in which a weight of $2^{1/2}$ is added in the w direction and a weight of one is added in the z direction. Accordingly, the distance in the original three-dimensional space can be approximated. For example, a weighted Euclidean distance (weightedEuclid) between a vector v1 and a vector v2 can be expressed by equation (1).

$$weightedEuclid(\vec{v}1, \vec{v}2) = \sqrt{\sum_i w_i^2 * (v_{1i} - v_{2i})^2} \quad (1)$$

For example, as described above, the Euclidean distance in which the weight of $2^{1/2}$ is added in the w direction and the weight of one is added in the z direction can be expressed by equation (2).

$$Euclid(\vec{v}_1, \vec{v}_2) = \sqrt{(v_{1x} - v_{2x})^2 + (v_{1y} - y_{2y})^2 + (v_{1z} - v_{2z})^2} \quad (2)$$
$$\approx \sqrt{(v_{1z} - v_{2z})^2 + 2(v_{1w} - v_{2w})^2}$$

The processing time pattern determination unit 140 executes the pre-processing to convert the processing time matrix P into the processing time matrix P', and then executes clustering to classify partially similar processing time vectors into the same cluster. For example, the processing time pattern determination unit 140 arranges the processing time vectors in the Q'-dimensional space, and performs clustering with a weighted distance by the subspace clustering (subspace clustering) technique or projected clustering (projected clustering) technique. The resultant set of clusters is C={c1, c2, . . . , cF}.

An example of subspace clustering executed by the processing time pattern determination unit 140 is described. Subspace clustering is a generic name for a plurality of techniques. Subspace clustering especially indicates finding methods in a bottom-up manner from a lower-dimensional space among techniques for finding those forming a cluster when a clustering in a high-dimensional space is projected onto a subspace parallel to the axis of the space. A representative algorithm of subspace clustering is CLIQUE. For example, the processing time pattern determination unit 140 may classify a processing time vector corresponding to each record data set into each cluster based on CLIQUE. For example, the process of CLIQUE is based on the document (R. AGRAWAL et al. "Automatic Subspace Clustering of High Dimensional Data," 1998.).

FIG. 10 is a diagram for schematically explaining the CLIQUE algorithm. In FIG. 10, the processing time pattern determination unit 140 partitions a one-dimensional space into a plurality of sections and counts the number of data sets included in each section. For example, the horizontal axis indicates the processing time for a query data set qA partitioned into a plurality of sections. The vertical axis indicates the processing time for a query data set qB partitioned into a plurality of sections. In the example illustrated in FIG. 10, those where the number of data sets included in a section exceeds a threshold value are, for example, sections A1, A2, A3, B1, and B2.

The processing time pattern determination unit 140 recounts the number of data sets belonging to a two-dimensional space and determines whether or not the number of data sets exceeds the threshold value to find what kind of two-dimensional space it becomes when the number of data sets included in each section of the one-dimensional space is lifted up to the two-dimensional space. For example, in the example illustrated in FIG. 10, H1 to H6 in two-dimensional space contain data. However, the number of data sets exceeds the threshold value in H1, H2, H3, and H6 in the two-dimensional space. The number of data sets is less than the threshold value in H4 and H5 in the two-dimensional space. Accordingly, in the two-dimensional space, H1, H2, H3, and H6 in the two-dimensional space are dense.

The processing time pattern determination unit 140 repeats the above process in three and four dimensions, and accordingly identifies a dense section in predetermined high dimensions to classify record data sets belonging to the dense section into the same cluster.

Next, an example of projected clustering executed by the processing time pattern determination unit 140 is described. Projected clustering is a generic name for a plurality of techniques. Projected clustering especially indicates finding methods in a top-down manner from a higher-dimensional space among techniques for finding those forming a cluster when a clustering in a high-dimensional space is projected onto a subspace parallel to the axis of the space. A representative algorithm of projected clustering is PreDeCon. For example, the processing time pattern determination unit 140 may classify record data corresponding to each record data set into each cluster based on PreDeCon.

PreDeCon is the algorithm based on DBSCAN. FIG. 11 is a flowchart schematically explaining the DBSCAN algorithm. In FIG. 11, a description is given taking an example where an entity of the process is the processing time pattern determination unit 140. As illustrated in FIG. 11, the processing time pattern determination unit 140 accepts the input of a distance threshold value eps and a density threshold value MinPts (Step S11).

The processing time pattern determination unit 140 selects an unselected point p from a dataset D (Step S12). For example, in Step S12, the dataset D is a set of processing time vectors included in the processing time matrix P'. The point p is a point corresponding to a processing time vector.

The processing time pattern determination unit 140 counts the number of the other points included in a sphere of the selected point p with the radius eps, and determines whether or not the number of points included in the sphere is equal to or more than the threshold value MinPts (Step S13). If the number of points included in the sphere is less than the threshold value MinPts (Step S13, No), the processing time pattern determination unit 140 determines the selected point p as noise (Step S14), and shifts to Step S12.

On the other hand, if the number of points included in the sphere is equal to or more than the threshold value MinPts (Step S13, Yes), the processing time pattern determination unit 140 finds out all points having a density connected relation with the selected point (Step S15). The processing time pattern determination unit 140 determines each point having the density-connected relation presented in Step S15 as a point included in the same cluster.

The processing time pattern determination unit 140 determines whether or not to have selected all points p (Step S16). If having not selected all the points p (Step S16, No), the processing time pattern determination unit 140 shifts to Step S12. On the other hand, if having selected all the points p (Step S16, Yes), the processing time pattern determination unit 140 terminates DBSCAN.

Figure 12A:
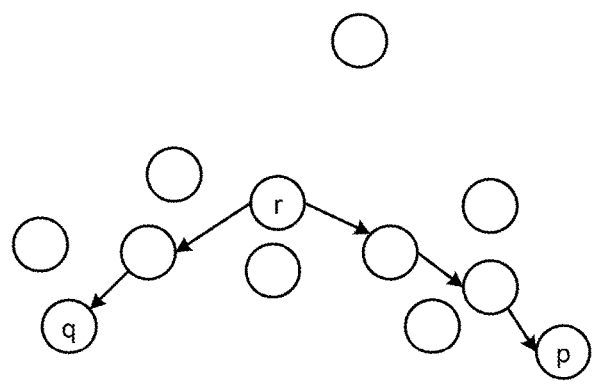
FIG. 12A is a first diagram for explaining the definition of density-connected.
Figure 12B:
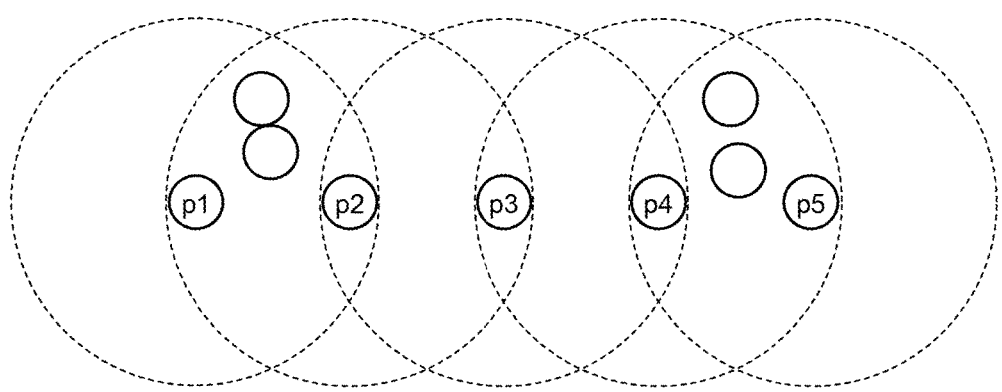
FIG. 12B is a second diagram for explaining the definition of density-connected.

The definition of density-connected presented in Step S15 of FIG. 11 is described here. FIGS. 12A and 12B are diagrams for explaining the definition of density-connected. For example, in FIG. 12A, points q and p are density-connected if there is a point r, which is not the points p and q, such that both the points p and q are density-reachable from the point r. The density-connected relation is symmetric.

Being density-connected does not satisfy a transitive relation. In FIG. 12B, in the density-connected relation, of points p1, p3, and p5, the points p1 and p5 are not density-connected.

Figure 13:
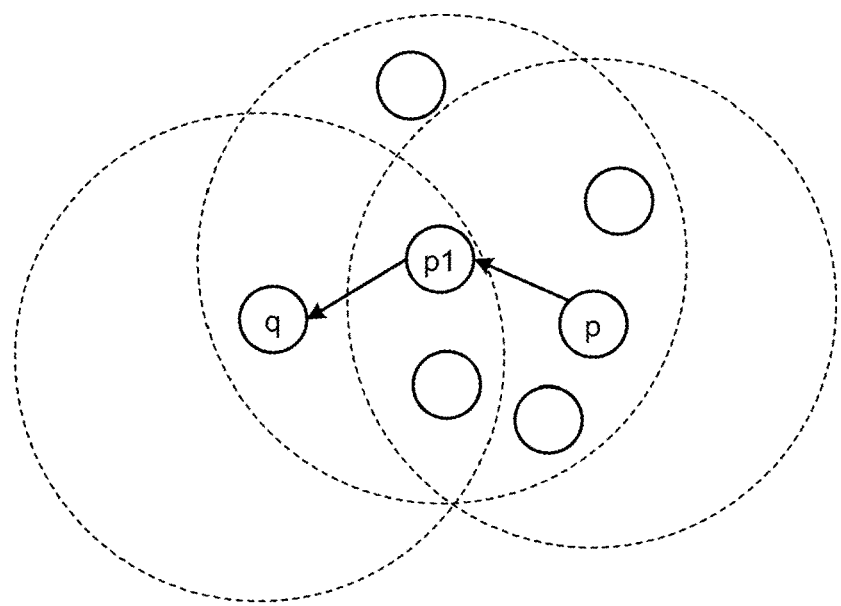
FIG. 13 is a diagram for explaining the definition of density-reachable.

The definition of density-reachable is described. FIG. 13 is a diagram for explaining the definition of density-reachable. A point q is density-reachable from a point p if there is a sequence of directly density-reachable points (p, p1, ..., pn, q). Density-reachability is not symmetric.

Figure 14:
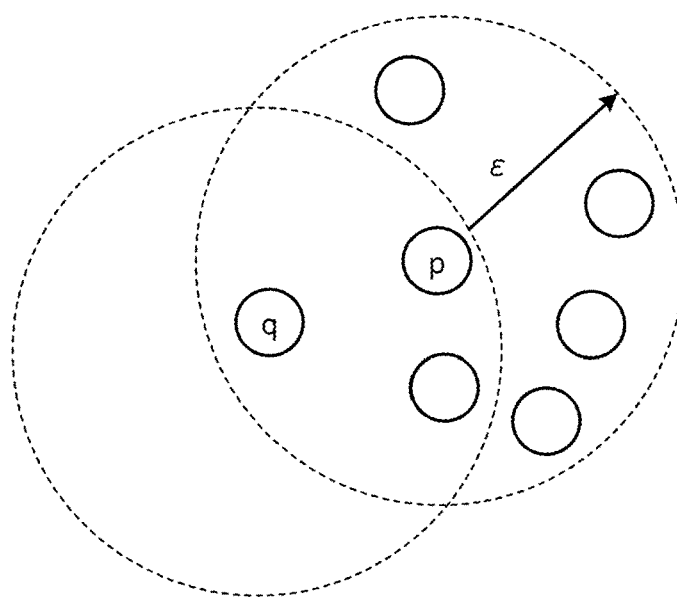
FIG. 14 is a diagram for explaining the definition of directly density-reachable.

The definition of directly density-reachable is described. FIG. 14 is a diagram for explaining the definition of directly density-reachable. A point q is directly density-reachable from a point p if the number of data sets within a sphere of a given distance threshold value δ exceeds N. For example, it can be expressed by equation (3). The directly density-reachable relation is not symmetric. For example, if there are more than N points around the point p, but there are less than N points around the point q, the point q is reachable from the point p, but the point p is not reachable from the point q.

$$(\text{dist}(p,q)<\varepsilon) \wedge (\#(B_\varepsilon(p))>N) \quad (3)$$

The processing time pattern determination unit 140 uses the above-mentioned subspace clustering technique or projected clustering technique to perform clustering. Accordingly, partially similar processing time vectors are classified into the same cluster. Consequently, each record data set is determined whether or not to belong to a cluster. Here, let a set of clusters belonging to a record data set ri be C_i. The number of elements of C_i is not limited to one but may be two or more, empty, or F number. Moreover, the dimension of a subspace to which each cluster belongs is different depending on the cluster.

The processing time pattern determination unit 140 sets cluster identification information of a cluster to which a record data set belongs in the record data table 110a, based on each record data set.

The processing time pattern determination unit 140 clusters record data sets, and then calculates the similarity of each record data set to generate the similarity matrix data 110c. For example, the processing time pattern determination unit 140 determines similarity d_ij between the record data sets ri and rj in accordance with an intersection of a set of clusters C_ij: =C_i∩C_j. In other words, record data sets within the same cluster indicate a similar processing pattern for some kind of query data and need to be arranged in different computational resources. Conversely, the arrangement of a data pair that does not have the same cluster does not require much consideration. In terms of similarity matrix D with R columns and R rows, a (i, j) component is assumed to be d_ij.

A description is given of an example of the process where the processing time pattern determination unit 140 determines the similarity d_ij between the record data sets ri and rj in accordance with the intersection of the set of clusters. The similarity is calculated based on the idea that record data sets belonging to the same cluster are similar and record data sets belonging to different clusters are not similar.

The simplest method for calculating the similarity is to, if the record data sets r1 and r2 belong to one cluster, measure a distance in a subspace to which each cluster belongs, and remove a minus. If the record data sets r1 and r2 belong to more than one cluster, a simple method is to take the average of similarity calculated from the clusters. However, the dimension of a subspace to which a cluster belongs is different depending on the cluster. Therefore, averaging merely is not preferable. Furthermore, it is natural to judge that record data sets having a higher-dimensional cluster in common are more similar. Hence, the processing time pattern determination unit 140 may calculate the similarity in such a manner as to increase the similarity as the dimension of a subspace to which a cluster belongs is increased.

For example, the distance between the record data sets r1 and r2 in a Q-dimensional vector space $R^Q$ is defined by equation (4).

$$d_{R^Q}(r1, r2) \quad (4)$$

In many cases, the distance between the record data sets r1 and r2 corresponds to a weighted Euclidean distance or weighted Lp distance. The subspace to which C_i belongs is defined as $R_{Ci}$. Standard projection from $R^Q$ to $R_{Ci}$ is $\pi_{Ci}$. The distance in $R_{Ci}$ between the record data sets r1 and r2 that belong to C_i is defined by equation (5). The set of clusters to which record data r belongs is represented by equation (6).

$$d_{C1}(r1, r2) = d_{R^Q}(\pi_{C1}(r1), \pi_{C1}(r2)) \quad (5)$$

$$Cr = \{c1^{(r)}, c2^{(r)}, \ldots, cF(r)^{(r)}\} \quad (6)$$

If the intersection of the set of clusters to which the record data sets r1 and r2 belong is not empty, the processing time pattern determination unit 140 calculates the similarity between the record data sets r1 and r2 with equation (7). When the intersection is empty, the processing time pattern determination unit 140 sets the similarity between the record data sets r1 and r2 as minus infinity.

$$sim(r1, r2) = -\sum_{c \in Cr2 \cap Cr2} \frac{dim(c)}{|Cr2 \cap Cr2|} d_c(r1, r2) \quad (7)$$

The processing time pattern determination unit 140 executes the above process repeatedly on each pair of record data sets to generate the similarity matrix data 110c.

The matching processing unit 150 is a processing unit that determines a computational resource based on the similarity matrix data 110c to arrange each record data set, and generates the arrangement location information 110d based on the determined result.

A specific description is given of the process of the matching processing unit 150. Firstly, the matching processing unit 150 refers to the record data table 110a, and randomly selects clusters each having N or more record data sets belonging to itself. N corresponds to the number of the computational resources S1 to SN. The matching processing unit 150 selects N record data sets from the selected cluster by sampling without replacement. In the following description, the record data sets selected from the cluster are expressed as the candidate data sets. Let the candidate data sets be v1, v2, ..., vN and let the computational resources be S1, S2, ..., SN. No record data is arranged in the computational resources S1 to SN the first time. Accordingly, the matching processing unit 150 randomly determines the arrangement location of each candidate data set and updates the arrangement location information 110d.

The matching processing unit 150 compares the candidate data set vi with the record data set already arranged in the computational resource Sj, and calculates the similarity between the candidate data set vi and the computational resource Sj from the second time on. The matching processing unit 150 identifies the record data set arranged in the computational resource Sj based on the arrangement location information 110d.

The matching processing unit 150 identifies the similarity between the candidate data set vi and the record data set already arranged in the computational resource Sj based on the similarity matrix data 110c. If a plurality of record data sets is arranged in the computational resource Sj, the matching processing unit 150 identifies similarity having a maximum value, as similarity kij between the candidate data set vi and the computational resource Sj, among the similarity of the candidate data set vi with the record data sets arranged in the computational resources Sj.

The matching processing unit 150 repeatedly executes the above process on the other candidate data sets, and accordingly creates an N×N matrix E having the similarity kij between a candidate data set and a computational resource in the (i, j) element. The matching processing unit 150 creates a preference list Lvi of the candidate data set vi based on the matrix E. The preference list Lvi is a list where the preference of a matching target is decreased as the computational resource Sj has a higher similarity with the candidate data set vi.

For example, the matching processing unit 150 sorts an i-th row of the matrix E in ascending order, determines the order of the computational resources Sj for the candidate data set vi, and sets the determined order as the preference list Lvi of the candidate data vi. When the matching processing unit 150 creates the preference list Lvi, kij=kij' may hold if j!=j'. However, either can be placed up upon sorting.

The matching processing unit 150 creates a preference list LSj of the computational resource Sj based on the matrix E. The preference list LSj is a list where the preference of a matching target is decreased as the candidate data set vi has a higher similarity with the computational resource Sj.

For example, the matching processing unit 150 sorts a j-th column of the matrix E in ascending order, determines the order of the candidate data sets vi for the computational resource Sj, and sets the determined order as the preference list LSi of the computational resource Sj.

The matching processing unit 150 creates preference lists Lv1 to LvN of the candidate data sets and preference lists LS1 to LSN of the computational resources, and then obtains a stable matching based on the extended GS algorithm to determine a computational resource to be an arrangement location of each candidate data set. The description of the extended GS algorithm is described later. The matching processing unit 150 registers the determination result in the arrangement location information 110d.

The matching processing unit 150 randomly selects clusters having N or more record data sets and repeatedly executes the above process while there are clusters having N or more record data sets. For example, the matching processing unit 150 may set a flag for a record data set whose arrangement location has already been determined to distinguish record data sets whose arrangement locations have been determined and record data sets whose arrangement locations have not been determined.

If there are not clusters having N or more record data sets, the matching processing unit 150 collects the record data sets of the cluster or record data sets determined to be noise. The matching processing unit 150 selects N record data sets from the collected record data sets by sampling without replacement, and executes the above process repeatedly.

If selecting a cluster in the above process, the matching processing unit 150 may preferentially select a cluster having a larger number of record data sets, and determine the arrangement locations of the record data sets. A cluster having a larger number of record data sets has more influence on the smoothing of variations in the entire processing time. Accordingly, it is better to preferentially select a cluster having a larger number of record data sets.

Furthermore, if selecting a cluster, the matching processing unit 150 may select a cluster based on the number of dimensions of a subspace to which the cluster belongs. For example, the matching processing unit 150 preferentially selects a cluster belonging to a subspace in higher dimensions. As the number of dimensions to which a cluster belongs increases, it takes a similar processing time with respect to many query data sets. Hence, a cluster having a larger number of dimensions has more influence on the smoothing of variations in the entire processing time. Accordingly, it is better to preferentially select a cluster having a larger number of dimensions.

For example, the matching processing unit 150 sets the order of preference to select clusters as follows: the "number of dimensions of a subspace to which the cluster belongs>the density of the cluster>the number of record data sets belonging to the cluster." If there is a plurality of clusters whose superiority or inferiority are not determined in the ordering of preference, the matching processing unit 150 selects clusters randomly.

Next, a description is given of an example of the stable matching problem (Stable marriage problem or Stable matching problem) used by the matching processing unit 150. The stable matching problem is a problem where if there are N men and N women, each men has a preference list of women, and each women has a preference list of men, stable pairs of the men and women are formed. Here, when the man and women are matched, if a man and a woman prefer the other than their current partner, they would run away together. Such a pair is called a blocking pair. A matching where the blocking pair exists is called an unstable matching. A matching where there is no blocking pair is called a stable matching.

FIG. 15 is a diagram for explaining a stable matching and an unstable matching. FIG. 15 illustrates a stable and an unstable matching between four men and four women. Let the four men be 1, 2, 3, and 4 and let the four women be a, b, c, and d. The men 1, 2, 3, and 4 each have a preference list of the women a, b, c, and d. For example, the man 2's order of preference is c, b, a, and d. For example, the woman b's order of preference is 2, 1, 4, and 3.

In a group 20a, pairs are (1, a), (2, c), (3, b), and (4, d). There is no blocking pair in the group 20a. The pairs in the group 20a can be said to be a stable matching.

In contrast, pairs are (1, a), (2, c), (3, d), and (4, b) in a group 20b. There is a blocking pair (4, d) in the group 20b since the man 4 prefers the woman d over the woman b, and the woman d prefers the man 4 over the man 3. Accordingly, the pairs in the group 20b can be said to be an unstable matching.

Figure 16:
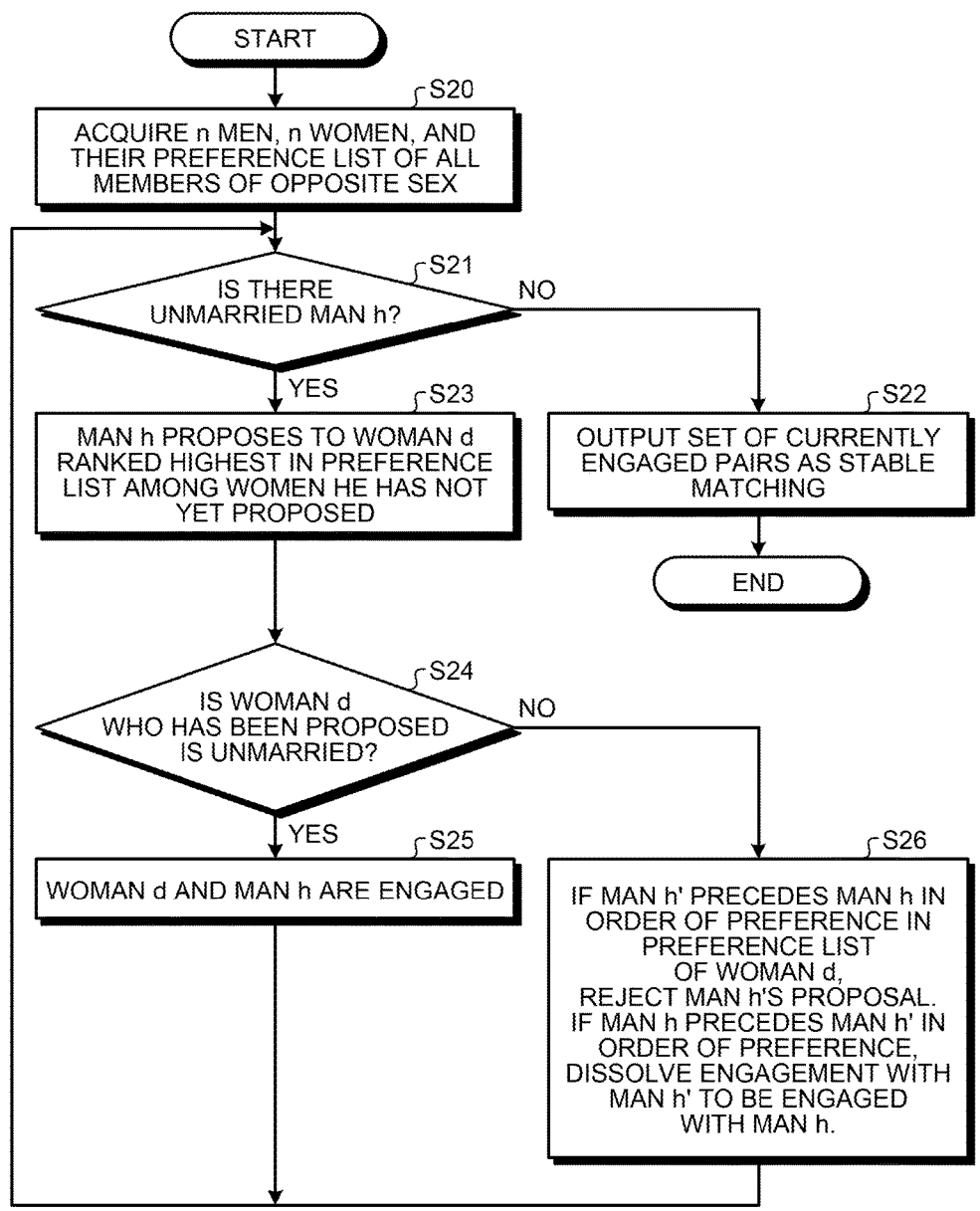
FIG. 16 is a diagram illustrating an example of a procedure for the process of the Gale-Shapley algorithm.

Next, a description is given of the Gale-Shapley (Gale-Shapley) algorithm for obtaining the stable matching illustrated in the group 20a of FIG. 15. FIG. 16 is a diagram illustrating an example of a procedure for the process of the Gale-Shapley algorithm. The stable matching can be obtained by executing the process of FIG. 16. In the following description, the Gale-Shapley algorithm is expressed as GS as appropriate.

As illustrated in FIG. 16, GS acquires n men, n women, and their preference list ranking all members of the opposite sex (Step S20). GS determines whether or not an unmarried man h exists (Step S21). If there is no unmarried man h (Step S21, No), a set of currently engaged pairs is output as a stable matching (Step S22).

On the other hand, if there is an unmarried man h (Step S21, Yes), GS causes the man h to propose to the woman d ranked highest in his preference list among women he has not yet proposed (Step S23). GS determines whether or not the woman d who has been proposed is unmarried (Step S24).

If the woman d is unmarried (Step S24, Yes), GS causes the woman d and the man h to be engaged with each other (Step S25), and shifts to Step S21. On the other hand, if the woman d is not unmarried (Step S24, No), GS shifts to Step S26.

If a man h' precedes the man h in the order of preference in the preference list of the woman d in Step S26, the woman d rejects the man h's proposal. If the man h precedes the man h' in the order of preference, the woman dissolves the engagement with the man h', and is then engaged with the man h. GS shifts to Step S21 after terminating the process of Step S26.

Next, the extended Gale-Shapley obtained by extending the Gale-Shapley algorithm is described. In the following description, the extended Gale-Shapley is expressed as the extended GS. The extended GS deletes a candidate pair that does not lead to a stable matching from the preference list in the middle of the algorithm. Specifically, in the extended GS, if the man h and the woman d are engaged, men preceded by the man h are deleted from the woman d's preference list. This point is different from GS. Such a process is added to enable more efficient execution of a stable matching than GS.

The matching processing unit 150 uses the above-mentioned extended GS algorithm to obtain a stable matching between candidate data and a computational resource. When obtaining a stable matching, the matching processing unit 150 may cause the candidate data to propose to the computational resource or the computational resource to propose to the candidate data.

The arrangement processing unit 160 is a processing unit that extracts record data from the record data table 110a, and arranges the extracted record data in the computational resources S1 to SN based on the arrangement location information 110d. In the initial process, the arrangement processing unit 160 randomly arranges, in the computational resources S1 to SN, the record data registered in the record data table 110a. The matching process is executed on the record data randomly arranged by the arrangement processing unit 160 to generate the above-mentioned intermediate table 110b.

Figure 17:
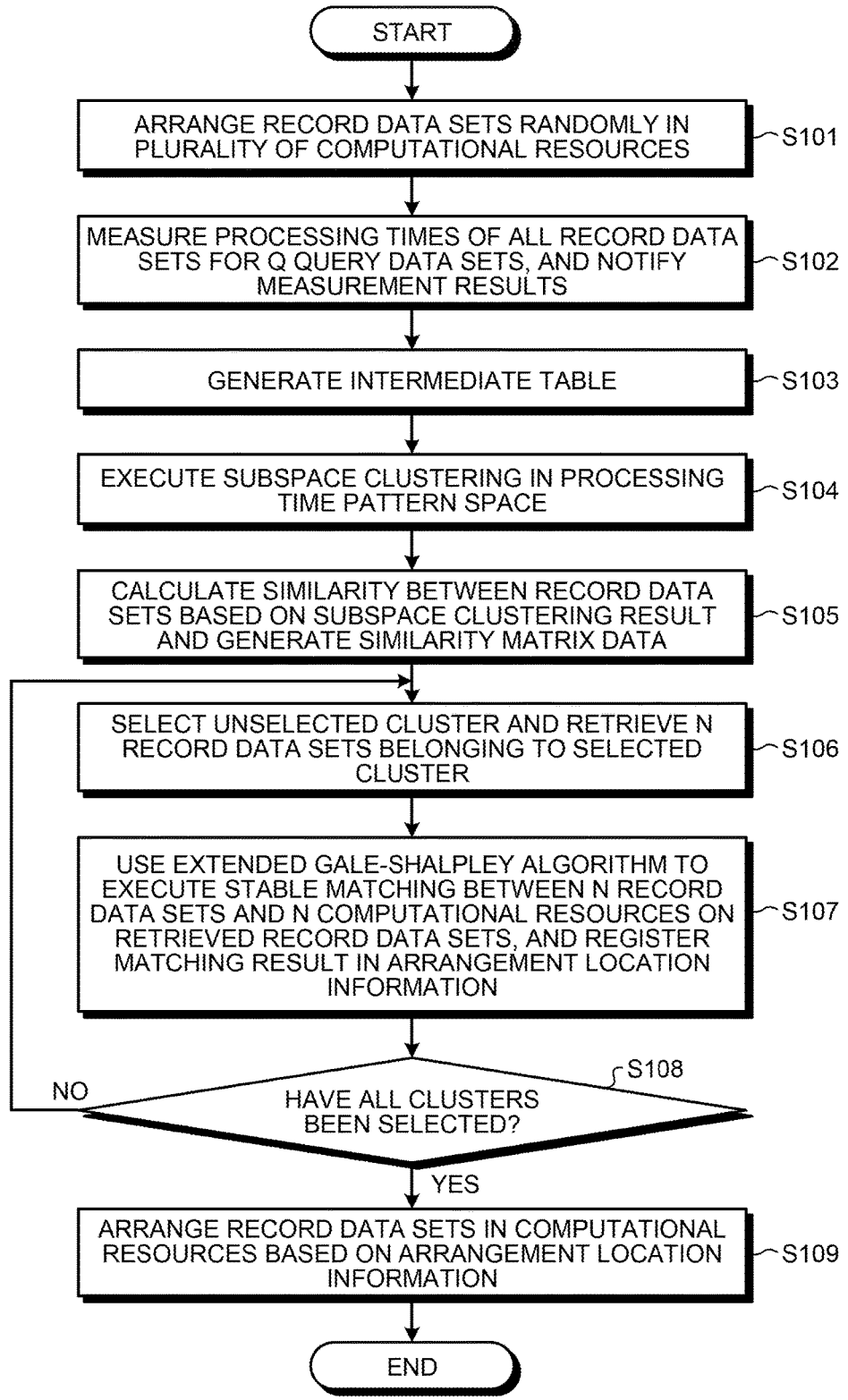
FIG. 17 is a flowchart illustrating a procedure for the process of a data processing apparatus according to the embodiment.

Next, a procedure for the process of the data arrangement apparatus 100 according to the embodiment is described. FIG. 17 is a flowchart illustrating the procedure for the process of the data processing apparatus according to the embodiment. As illustrated in FIG. 17, the arrangement processing unit 160 of the data arrangement apparatus 100 randomly arranges the record data registered in the record data table 110a in the plurality of the computational resources S1 to SN (Step S101).

The computational resources S1 to SN of the data arrangement apparatus 100 measure processing times of all the record data sets for Q query data sets, and notifies the processing time pattern determination unit 140 of the processing times (Step S102). The processing time pattern determination unit 140 of the data arrangement apparatus 100 generates the intermediate table 110b (Step S103).

The processing time pattern determination unit 140 executes subspace clustering in a processing time pattern space (Step S104). The processing time pattern determination unit 140 may execute projected clustering instead of subspace clustering in Step S104. The processing time pattern determination unit 140 calculates similarity between the record data sets based on the subspace clustering result, and generates the similarity matrix data 110c (Step S105).

The matching processing unit 150 selects an unselected cluster and retrieves N record data sets belonging to the selected cluster (Step S106). The record data sets retrieved in Step S106 correspond to the candidate data sets. The matching processing unit 150 uses the extended Gale-Shalpley algorithm to execute a stable matching between the N record data sets and the N computational resources on the retrieved record data sets. The matching processing unit 150 registers the matching result in the arrangement location information 110d (Step S107).

The matching processing unit 150 determines whether or not to have selected all clusters (Step S108). If not having selected all the clusters (Step S108, No), the matching processing unit 150 shifts to Step S106. On the other hand, if having selected all the clusters (Step S108, Yes), the matching processing unit 150 shifts to Step S109.

The arrangement processing unit 160 of the data arrangement apparatus 100 arranges the record data sets in the computational resources based on the arrangement location information 110d (Step S109).

Next, the effect of the data arrangement apparatus 100 according to the embodiment is described. The data arrangement apparatus 100 calculates the processing times for query data for divided record data sets stored in the computational resources S1 to SN, and the record data sets processed with the query data. The data arrangement apparatus 100 then arranges the record data sets in the computational resources S1 to SN in such a manner as to distribute the processing times, and processes the query data. Consequently, it is possible to prevent the concentration of record data sets having the same similarity in a certain computational resource and reduce the time needed to execute the query data.

The data arrangement apparatus 100 calculates the processing times for query data for divided record data sets stored in the computational resources S1 to SN, and the record data sets processed with the query data, and generates the intermediate table 110b. The data arrangement apparatus 100 uses the intermediate table 110b to enable the prevention of the arrangement of record data sets whose processing times are partially similar in the same computational resource. If query data and record data are similar, the processing time is increased. Accordingly, the processing time indicated in the intermediate table 110b can be said to be an index indicating the similarity between the query data and the record data.

The data arrangement apparatus 100 executes clustering to classify, into the same cluster, a set of record data sets whose values of the processing times for each process request are partially similar, based on the intermediate table 110b. The data arrangement apparatus 100 distributes the data sets included in the same cluster to different databases.

Consequently, it is possible to prevent record data sets whose processing times are partially similar from being arranged in the same computational resource.

In terms of the intermediate table 110*b*, the data arrangement apparatus 100 merges those whose values of similarity between a plurality of column data sets are similar to reduce the dimensions. Consequently, a calculation burden can be reduced.

Figure 18:
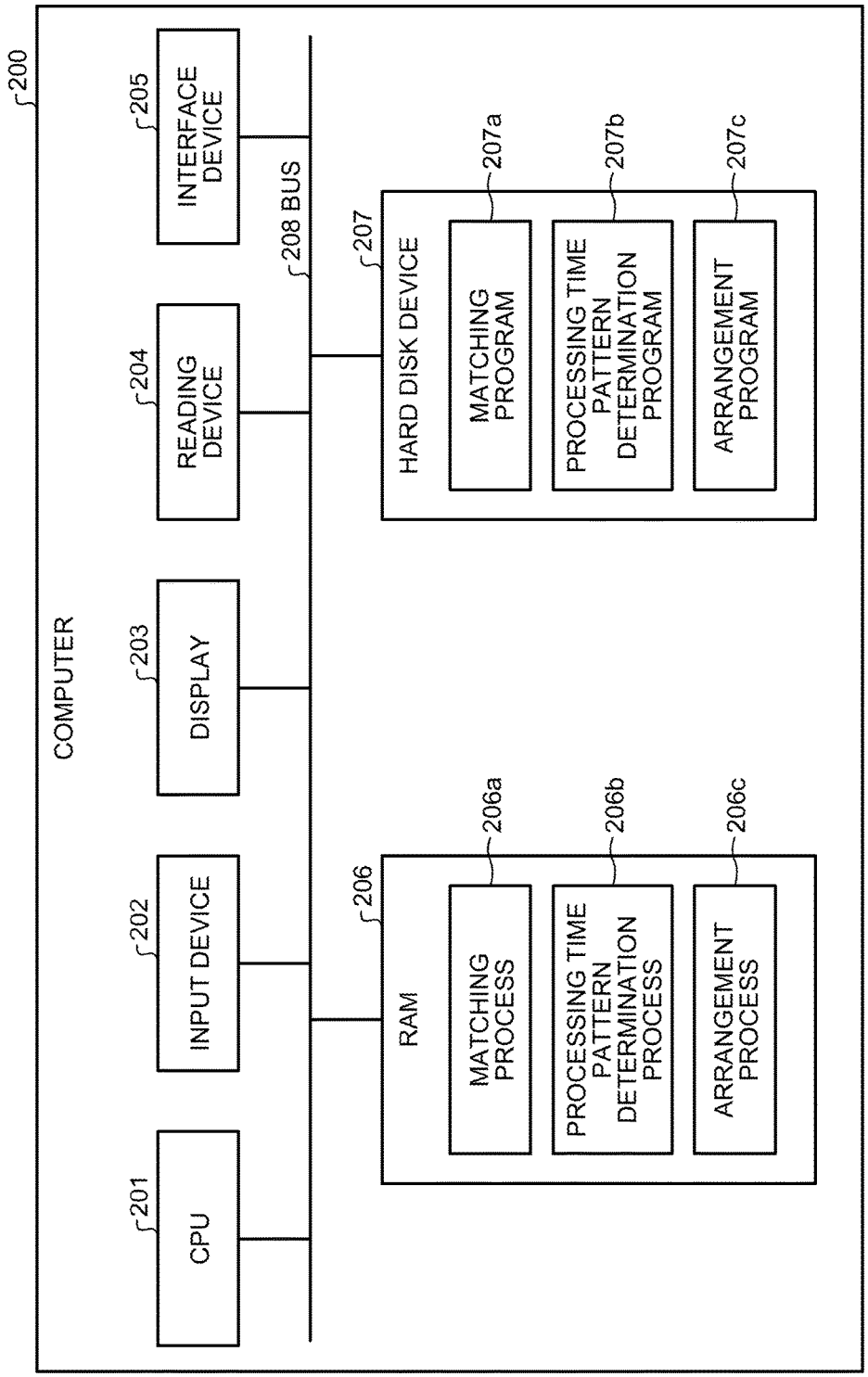
FIG. 18 is a diagram illustrating an example of a computer that executes a data arrangement program.
Figure 19:
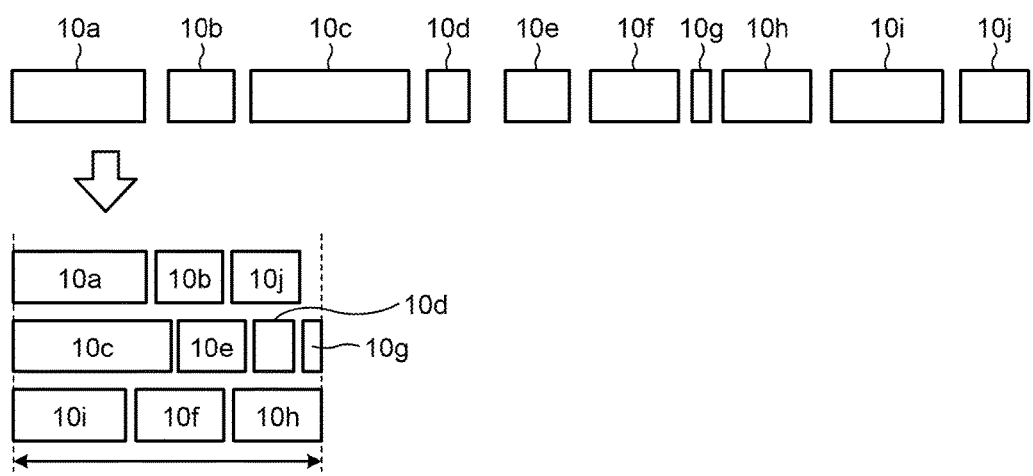
FIG. 19 is a diagram for explaining an example of a known technology.

Next, a description is given of an example of a computer that executes a data arrangement program to achieve similar functions to the data arrangement apparatus 100 illustrated in the above embodiment. FIG. 18 is a diagram illustrating an example of the computer that executes the data arrangement program.

As illustrated in FIG. 18, a computer 200 includes a CPU 201 that executes various computation processes, an input device 202 that accepts the input of data from a user, and a display 203. Moreover, the computer 200 includes a reading device 204 that reads a program and the like from a storage medium, and an interface device 205 that gives and receives data to and from another computer via a network. Moreover, the computer 200 includes RAM 206 that temporarily stores various types of information, and a hard disk device 207. The devices 201 to 207 are connected to a bus 208.

The hard disk device 207 includes a matching process program 207*a*, a processing time pattern determination program 207*b*, and an arrangement process program 207*c*. The CPU 201 reads the matching process program 207*a*, the processing time pattern determination program 207*b*, and the arrangement process program 207*c* to develop them in the RAM 206.

The matching process program 207*a* functions as a matching process 206*a*. The processing time pattern determination program 207*b* functions as a processing time pattern determination process 206*b*. The processing of the matching process 206*a* corresponds to the matching processing unit 150. The processing time pattern determination process 206*b* corresponds to the processing time pattern determination unit 140. An arrangement process 206*c* corresponds the arrangement processing unit 160.

The matching process program 207*a*, the processing time pattern determination program 207*b*, and the arrangement process program 207*c* are not necessarily stored in the hard disk device 207 from the beginning. For example, each program is stored in advance in a "portable physical medium" such as a flexible disk (FD), CD-ROM, DVD disk, magneto-optical disk, or IC card that is inserted into the computer 200. The computer 200 may read and execute the programs 207*a* to 207*c*.

According to one embodiment of the present invention, it is possible to shorten the time needed to execute query data.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a data arrangement program that causes a computer to execute a process comprising:

calculating a similarity between a process request and a piece of data to generate an intermediate table, by processing each of a plurality of pieces of data that are stored in a database by each of process requests of a plurality of types to measure a time taken by the processing, the time being used as an index indicating the similarity, the intermediate table indicating the similarity for each combination of the plurality of pieces of data and the process requests and having a dimension equal to a number of the process requests;

merging process requests in the intermediate table whose similarities with respect to same pieces of data are similar one another to reduce the dimension;

classifying into a same cluster pieces of data, similarities thereof with respect to same process requests indicated in the intermediate table being partially similar one another, and arranging each of the pieces of data included in the same cluster respectively in different computational resources; and processing a process request accepted, for the pieces of data that are arranged in the computational resources.

2. A data arrangement method that is executed by a computer, the data arrangement method comprising:

calculating a similarity between a process request and a piece of data to generate an intermediate table, by processing each of a plurality of pieces of data that are stored in a database by each of process requests of a plurality of types to measure a time taken by the processing, the time being used as an index indicating the similarity, the intermediate table indicating the similarity for each combination of the plurality of pieces of data and the process requests and having a dimension equal to a number of the process requests;

merging process requests in the intermediate table whose similarities with respect to same pieces of data are similar one another to reduce the dimension;

classifying into a same cluster pieces of data, similarities thereof with respect to same process requests indicated in the intermediate table being partially similar one another, and arranging each of the pieces of data included in the same cluster respectively in different computational resources; and processing a process request accepted, for the pieces of data that are arranged in the computational resources.

3. A data arrangement apparatus comprising:

a processor that executes a process comprising:

calculating a similarity between a process request and a piece of data to generate an intermediate table, by processing each of a plurality of pieces of data that are stored in a database by each of process requests of a plurality of types to measure a time taken by the processing, the time being used as an index indicating the similarity, the intermediate table indicating the similarity for each combination of the plurality of pieces of data and the process requests and having a dimension equal to a number of the process requests;

merging process requests in the intermediate table whose similarities with respect to same pieces of data are similar one another to reduce the dimension;

classifying into a same cluster pieces of data, similarities thereof with respect to same process requests indicated in the intermediate table being partially similar one another, and arranging each of the pieces of data included in the same cluster respectively in different computational resources; and processing a process request accepted, for the pieces of data that are arranged in the computational resources.

* * * * *